March 14, 1944.          P. PUESCHEL          2,344,367
BIRD FEEDER
Filed Nov. 2, 1942          2 Sheets-Sheet 1
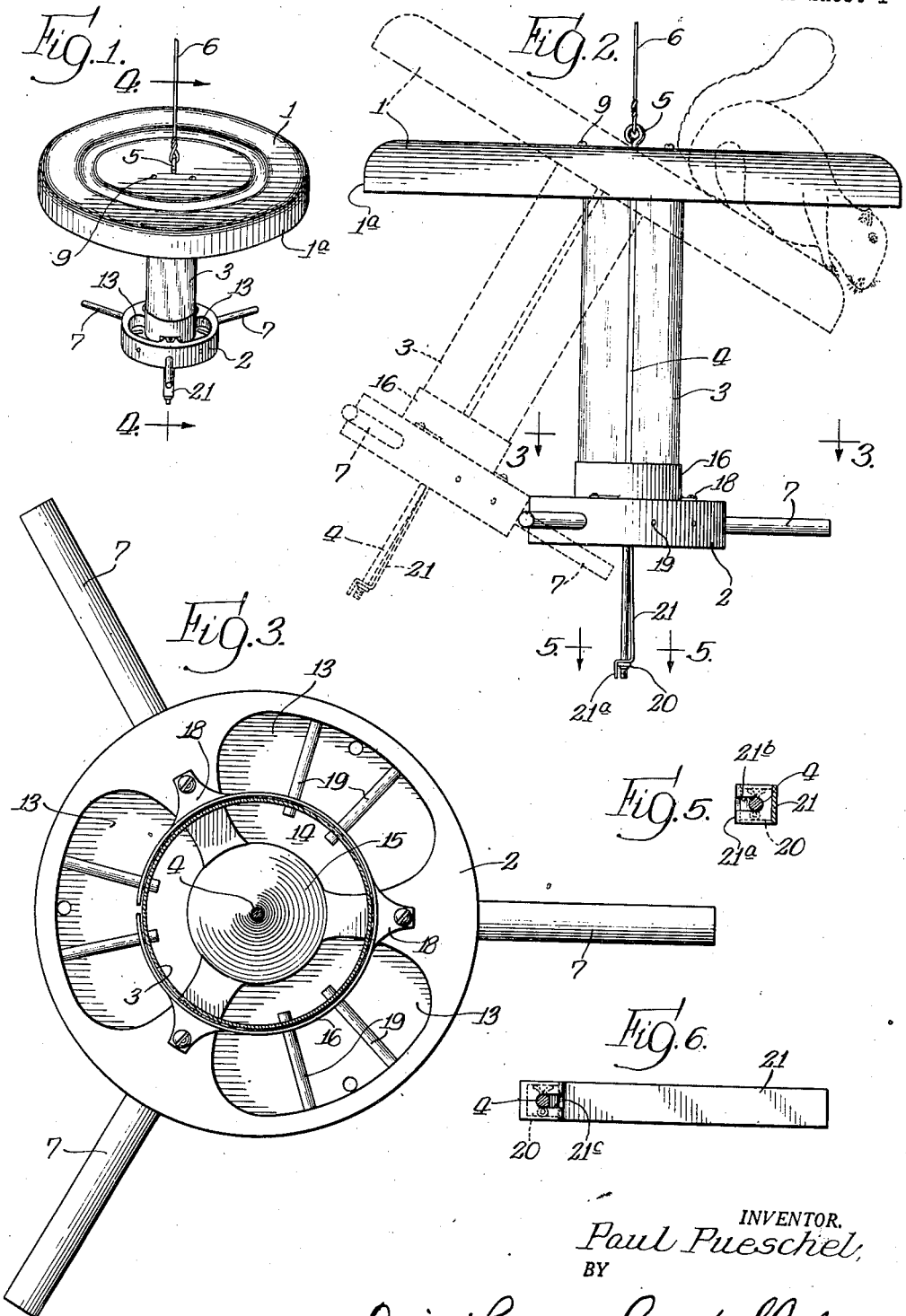
INVENTOR.
Paul Pueschel,
BY
Davis, Lindsey, Smith & Shorts
attys

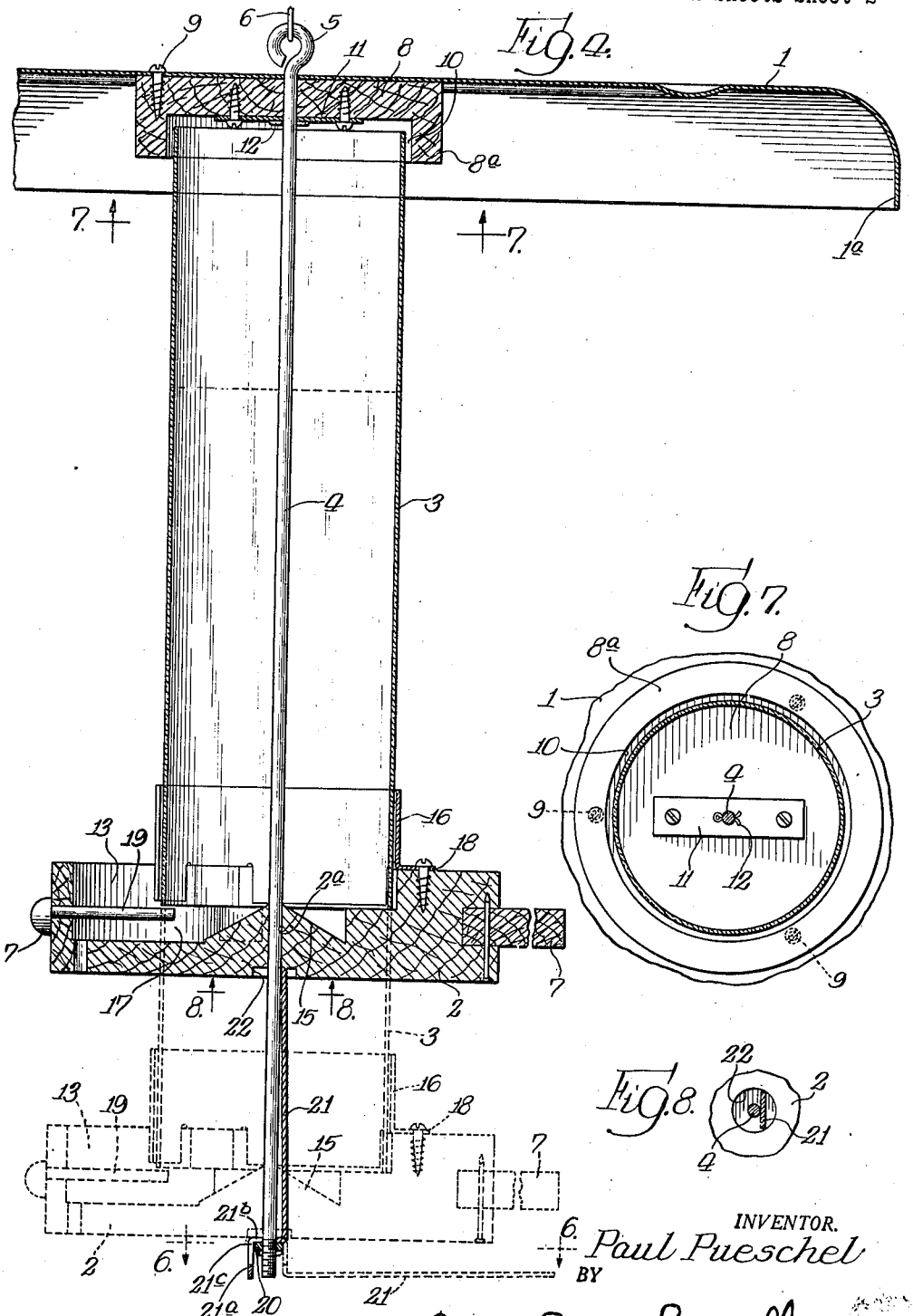

Patented Mar. 14, 1944

2,344,367

UNITED STATES PATENT OFFICE 2,344,367

BIRD FEEDER

Paul Pueschel, Glencoe, Ill.

Application November 2, 1942, Serial No. 464,203

15 Claims. (Cl. 119—52)

My invention relates to bird feeders and has to do particularly with a device of that character adapted for outdoor installation.

In the use of bird feeders, considerable difficulty is experienced with squirrels and other animals taking the feed. Such devices are usually suspended from a line or support between two objects such as trees or a house and tree or suspended from a tree or other object having overhanging portions, thereby tending to make it difficult for squirrels or other animals to reach and take the feed. It has been found, however, that in time squirrels, especially, have reached these devices and have taken the feed. It is, therefore, one of the objects of my invention to provide a device which positively prevents the theft of feed by animals.

Another object is to provide a device of the foregoing character which is tiltably suspended in such a manner that when an animal attempts to move along the shelter-like top thereof for the purpose of reaching over the outward edge of the top to the bottom, the device tilts, throwing the bottom away from the animal so as to maintain a fixed spacing between the top and the feed chambers. This tilting action also tends to dislodge the animal from the device.

The feed employed usually consists of a mixture of seed and it has been found that certain birds like only part of this mixture and therefore try to segregate the same by movement of beaks back and forth in the feed trough. It has also been found that certain birds like the smaller portions of the feed, which generally find their way to the bottom of the trough, and they attempt to throw the upper part of the seed out of the trough in order to get at the finer seed. In both of the foregoing instances, the birds spill and waste considerable seed, and it is another object of this invention to prevent the birds from moving their heads back and forth with beaks buried in the seed.

The feed container must, of course, be closed and, at the same time, adjustable in such a way as to permit ready filling with seed or other feed. To this end, another object of the invention is to provide an improved feed container which is adjustable from an open to a closed position.

Still another object is to provide improved means for latching the feed container in its closed position, which means is also adapted to position the feed container in a predetermined open position wherein feed may readily be applied thereto.

A further general object is to provide an improved all-weather bird feeder which is quite simple in construction, may be easily and cheaply manufactured, and which is adapted to serve its bird feeding purpose in a highly efficient manner.

Other objects and advantages will become apparent as this description progresses and by reference to the drawings wherein, Figure 1 is a perspective view of one form of device embodying my invention;

Fig. 2 is an enlarged elevational view of the structure shown in Fig. 1, the feeder being shown in dotted lines in the position assumed when an animal is upon its top;

Fig. 3 is an enlarged sectional view taken substantially on line 3—3 of Fig. 2;

Fig. 4 is an enlarged sectional view taken substantially on line 4—4 of Fig. 1, the feeder latching member being shown in dotted lines in open position;

Fig. 5 is an enlarged sectional view taken substantially on line 5—5 of Fig. 2;

Fig. 6 is a sectional view similar to Fig. 5 but taken on line 6—6 of Fig. 4 and showing the feeder latching member in an open or unlatched condition.

Fig. 7 is a sectional view taken substantially on line 7—7 of Fig. 4; and

Fig. 8 is a sectional view taken substantially on line 8—8 of Fig. 4.

The bird feeder shown in the drawings includes a cover 1 (Figs. 1, 2 and 4), a feed trough 2 and a storage receptacle 3 which are connected together and supported as a unit by a rod 4 passing centrally therethrough. The rod 4 at its upper end is provided with a loop 5 which is adapted to receive a cord or other flexible support 6 from which the rod and feeder as a whole is suspended so that it is free to tilt and swing in all directions, as illustrated, for example, in dotted lines in Fig. 2.

The cover 1 takes the form of a broad dome-like structure having downwardly curved peripheral flanges 1a. This cover is, preferably, circular and is of such diameter that its periphery extends considerably outward beyond the feeder 2 and the bird perches 7 thereon, thus providing a shelter for both the feed in the trough 2 and the bird feeding thereon. The inner central portion of the cover supports a circular block-like member 8 which is secured thereto by a plurality of screws 9. The block member 8 is provided with a depending peripheral annular flange 8a which forms a well 10 that receives and confines the upper end of the feed storage receptacle 3. The bottom of the well 10 is provided with a wear plate 11 having an opening coinciding with the central opening in the block 8 through which the rod 4 passes. The cover 1 is positioned at a predetermined height along the rod 4 by a cotter pin 12 or other suitable device passed through the rod 4 at the upper end thereof and against which the wear plate 11 seats. The cover 1 is of such diameter and the device is suspended in such close proximity to the rod suspension loop 5, that, if an animal, such as a squirrel, as illustrated in Fig. 2, were to find its way to the top thereof and attempt to reach out over the edge of the cover to the feed trough below, the device would swing (Fig. 2), thereby tilting the feeder as a whole and throwing the feed trough 2 away from the animal. The spacing between the outer edge of the cover and the feed trough 2 is such that the trough cannot be reached by the squirrel even though it were able to maintain its position at the edge of the cover so as to reach toward the feed trough. In this way the theft of feed by animals is constantly guarded against.

The feed trough 2 is of circular form and is provided with a plurality of comparatively deep, equally spaced, exteriorly accessible feed openings or pockets 13, the inner portions of which open into a central well-like portion 14 having a central conical bottom 15 which tends to uniformly distribute feed outwardly toward the pockets 13. The well 14 is defined in part by a cylindrical sleeve-like member 16 projecting down into the well 14 to a sufficient extent to define slotted openings 17 (Fig. 4) leading from the well 14 into the pockets 13. This sleeve-like member is secured to the feed trough 2 by a plurality of flanges 18 struck therefrom and secured to the trough at its upper side intermediate the pockets 13. The sleeve member 16 also serves as a retainer for the lower end of the cylindrical feed receptacle 3 which, preferably, fits snugly therein.

A wide variety of birds may use the feeder. As above explained, the feed used may consist of a mixture of different kinds of seed and some birds may like some parts of the seed and some birds other parts thereof. The seed may be of different sizes. Some birds may prefer the finer seed and others the coarser seed. In any event, the birds try to segregate the particular seed that they prefer and in doing so they usually insert their beaks in the feed openings 13 and move them vigorously in an attempt to throw out the feed they do not prefer. This, of course, results in considerable feed waste, and my invention includes means to eliminate the same. More particularly, in each feed compartment or opening 13 I mount a pair of spaced pin or pegs 19 located about midway the depth of the feed openings. These pins or pegs 19 extend radially inward terminating substantially at the cylindrical member 16 so as to obstruct movement of the bird's beak to such an extent as to prevent and discourage an attempt to move the beak back and forth with sufficient rapidity to throw out the seed.

The feed receptacle 3 is formed, preferably, of a transparent material so that the feed confined therein may readily be observed. This receptacle is, preferably, retained or carried by the feed trough 2 which may be raised and lowered as will be explained hereinafter, to permit addition of feed to the receptacle. However, normally, the receptacle is confined and retained in closed condition (Figs. 2 and 4), its upper end being closed by the cover member 8. Both the upper and lower ends of the receptacle 3 are closed in such a way that the feed therein is fully protected against weather conditions.

The cover, receptacle and feed trough are retained in normal feeding condition by retaining means which will now be described. Specifically, the rod 4 passes through a central opening 2a in the bottom of the feed trough 2, the rod being of sufficient length to extend a substantial distance below the bottom of the feed trough. The lower end of the rod threadedly receives a stop member 20 upon which is supported a rod-carried latch member 21. The lower end of the latch member 21 is provided with a right-angled offset portion having right-angled legs 21a and 21b with a slot 21c extending through both legs thereof for reception of the rod 4. With this arrangement the latch member is loosely hinged upon the rod 4 and is capable of movement between an upright position, such as shown in full lines in Figs. 2 and 4, and a horizontal position, such as shown in dotted lines in Fig. 4. In the upright position of the latch member its leg 21b seats upon and is supported by the stop member 20; and in its horizontal position its leg 21a is supported upon the stop member 20. The bottom of the feed trough 2 is provided with an annular recess 22 surrounding the rod 4 and of sufficient width to receive the upper end of the latch member 21. When the cover 1, feed trough 2 and receptacle 3 are in their normal closed condition (Figs. 2 and 4), the upper end of the latch 21 is received in the recess 22 and these parts are latched in that condition. In this condition the feed receptacle 3 and the feed trough 2 are supported by the latch member 21; and the feed receptacle is of such length that when the parts are so supported its upper end is slightly spaced from the bottom of the well 10. This enables the feed unit to be slightly raised to disengage the latch member 21 from the recess 22 to permit lowering of the feed unit upon the rod 4.

When it is desired to add feed to the receptacle 3, the latch 21 is released and moved to the position shown in dotted lines in Fig. 4. This permits the feed trough and receptacle 3 with the feed therein to be lowered downwardly along the rod 4 a sufficient extent to permit ready access to the upper end of the receptacle 3 for the insertion of feed material. The latch member and its stop readily support the parts in this feed-receiving position so that, with the feeder as a whole suspended from the cord 6, feed may be readily and quickly added to the device without spilling and waste. As soon as the feed has been added the feed unit (receptacle 3 and feed trough 2) is then slid upwardly along the rod 4 to the closed position of Figs. 2 and 4.

I believe that the operation and advantages of my invention will readily be understood from the foregoing description. My invention provides a bird feeder which is substantially foolproof against feed theft by animals. It provides a feeder which is suitable for all weather conditions. It provides a feeder which may be easily and readily installed, a feeder which may readily be manipulated in the addition of feed thereto, a feeder which avoids wastage of the feed material, and a feeder which is quite inexpensive but highly efficient for the purpose intended.

I claim:

1. A bird feeder comprising a cover member, a rod member having a swing connection at one end thereof, means for directly fastening said cover centrally to said rod member in close proximity to said swing connection, a feed trough mounted upon said rod member for slide movement therealong beneath said cover, releasable means for holding said trough in a predetermined position along said rod member, and a feed receptacle mounted upon said rod member and normally confined in closed condition by and between said cover and trough, said rod being of a length extending below said trough and said releasable means being adapted to be released to permit said trough to be slid from its said predetermined position downwardly along said rod.

2. A bird feeding device comprising a tubular feed storage receptacle, a trough adapted to receive feed from said receptacle and having annularly spaced feed openings therein, a cover disposed above said receptacle, a first member enclosing the top of said receptacle and secured to said cover, a second member embracing the bottom of said receptacle and secured to said trough, said second member having portions extending into said feed openings and defining reduced openings leading from said second member to the outer portions of said feed openings, said trough having seat portions between said feed openings upon which the bottom of said receptacle is seated with its interior connected to said feed openings through said reduced openings, and suspension means securing together the elements named to form a unitary structure, said cover being fixed to said suspension means with said receptacle and trough being capable of slide movement therealong.

3. A bird feeding device comprising a feed storage receptacle, a trough adapted to receive feed from said receptacle, a cover adapted to protect said receptacle and said trough from the weather, said cover having a horizontal top portion with a depending peripheral rim and being of substantially greater width than said trough and receptacle, said cover and trough having aligned central apertures therein, suspension means passing through said aligned apertures and centrally through said receptacle for securing said cover, trough and receptacle together to form a unitary structure, means fixing said cover to said suspension means at the upper end thereof so that said suspension means and cover form a rigid unit with said suspension means at right angles to the cover top portion, and a swing connection on said suspension means at the cover-secured end thereof in juxtaposed relationship with the top portion of said cover.

4. A bird feeder comprising a suspension rod, a cover secured to the upper end of said rod, a trough slidably mounted on said rod, a feed receptacle supported by said trough and slidable along said rod with said trough, the upper end of said receptacle being normally closed by said cover, latch means between said trough and rod normally holding said trough and receptacle in closed position, said latch means being releasable to permit lowering of said trough and receptacle away from said cover to permit access to the upper end of said receptacle.

5. A bird feeding device comprising a feed storage receptacle, a trough supporting said receptacle and adapted to receive feed therefrom, a cover adapted to protect said receptacle and said trough from the wheather, suspension means including a rod for securing together the elements named to form a unitary structure with the upper end of said receptacle closed by said cover, and latching means cooperating with said rod for releasably retaining said structure in closed and open positions, said cover being fixed to said rod and said trough being slidable therealong away from said cover whereby said trough and receptacle, upon release of said latching means, may be lowered a sufficient distance away from said cover to render said receptacle readily accessible for the addition of feed thereto.

6. A bird feeding device comprising a tubular feed storage receptacle, a trough adapted to receive feed from said receptacle and having exteriorly accessible feed openings therein, a cover disposed above said receptacle, a member carried by said cover and enclosing the top of said receptacle, another member carried by said trough and enclosing the bottom of said receptacle and providing restricted passageways leading from said receptacle to said feed openings, suspension means including a rod for securing together the elements named to form a unitary structure, latching means cooperating with said rod for retaining said receptacle and trough against said first member, said latch means being releasable to lower said receptacle and trough to permit feed to be inserted into the upper end of said receptacle.

7. A bird feeding device comprising a feed storage receptacle member, a trough member having exteriorly accessible feed openings therein communicating with and adapted to receive feed from said receptacle member, a cover member having a horizontal top portion with a depending peripheral rim adapted to protect said receptacle member and feed openings from the weather, and suspension means securing together said members to form a unitary structure, the lower end of said suspension means projecting below said trough and its upper end having a swing connection closely adjacent the top portion of said cover member whereby said cover is adapted to tilt and in turn tilt said trough to like extent when pressure is applied to said cover portion at a point spaced from said swing connection, and means permitting said trough and receptacle to be lowered along said suspension means away from said cover to permit access to said receptacle.

8. A bird feeding device comprising a feed storage receptacle member, a trough member mounted beneath and supporting said receptacle member and having exteriorly accessible feed openings therein, radially projecting perches extending peripherally from said trough member closely adjacent said feed openings, a cover member having a horizontal top portion adapted to protect said receptacle member, feed openings and perches from the weather, and suspension means for securing together said members to form a unitary structure, said means having a swing connection closely adjacent the top portion of said cover member whereby pressure exerted upon the cover sufficient to overcome the weight of the parts below will tilt the cover and the feeder as a whole about said swing connection thereby maintaining the spacing relationship between the swing connection, cover and feed trough as they are tilted.

9. A bird feeding device comprising a feed storage receptacle, a trough adapted to receive feed from said receptacle, a cover disposed above said receptacle, a first member enclosing the top of said receptacle and secured to said cover, a second member embracing the bottom of said receptacle and secured to said trough, suspension means including a rod for securing together the elements named to form a unitary structure, said rod having means at one end thereof adapted to hold said cover in a fixed position on said rod, said receptacle and trough being slidably mounted upon said rod, and latching means between said rod and trough for releasably retaining said receptacle and trough against said first member.

10. A bird feeding device comprising a feed storage receptacle member, a trough member adapted to receive feed from said receptacle member, a cover member disposed above said receptacle member, suspension means including a rod for securing together the members named to form a unitary structure, said trough member having an aperture in its bottom, said receptacle and trough being slidably mounted upon said rod, latching means including a lever cooperating with and swingably mounted on said rod and adapted to engage said aperture to releasably retain said member in normal position, the arrangement being such that upon release of said lever from said aperture said trough and receptacle may be lowered a sufficient distance away from said cover member to permit the insertion of feed in said receptacle.

11. In a bird feeding device of the suspension type comprising a feed storage receptacle member, a trough member having feed cavities formed therein adapted to receive feed from said receptacle member, a cone centrally located in said trough member to uniformly distribute the flow of feed to said feed cavities from said receptacle member, a cover member having a horizontal top portion wider than said trough and adapted to protect said receptacle member and said trough member from the weather, and suspension means fixedly secured to said cover and adjustably secured to said trough for securing together said members to form a unitary structure and having a swing connection at its upper end closely adjacent the top portion of said cover permitting the feeder as a whole to tilt when pressure sufficient to overcome the weight of the parts below is applied to the outer part of the top portion of said cover member.

12. A bird feeder comprising a suspension rod, a cover secured to the upper end of said rod, a trough slidably mounted on said rod, a feed receptacle supported by said trough and slidable along said rod with said trough, the upper end of said receptacle being normally closed by said cover, means between said trough and rod normally holding said trough and receptacle in closed position, said means being releasable to permit lowering of said trough and receptacle away from said cover to permit access to the upper end of said receptacle.

13. A bird feeder comprising a suspension rod, a cover secured to the upper end of said rod, a trough slidably mounted on said rod, a feed receptacle supported by said trough and slidable along said rod with said trough, the upper end of said receptacle being normally closed by said cover, and means between said trough and rod normally holding said trough and receptacle in closed position, said means being releasable to permit lowering of said trough and receptacle away from said cover to permit access to the upper end of said receptacle and adapted to limit the extent to which said trough and receptacle may be lowered and for holding them in their lowered position.

14. A bird feeding device comprising a feed storage receptacle, a trough adapted to receive feed from said receptacle, a cover disposed above said receptacle, a first member enclosing the top of said receptacle and secured to said cover, a second member embracing the bottom of said receptacle and secured to said trough, suspension means including a rod for securing together the elements named to form a unitary structure, said rod having means at one end thereof adapted to hold said cover in a fixed position on said rod, said receptacle and trough being slidably mounted upon the other end of said rod, and means between said rod and trough for retaining said receptacle and trough against said first member and releasable to permit said trough and cover to slide downwardly along said rod.

15. A bird feeding device comprising a feed storage receptacle, a trough adapted to receive feed from said receptacle, a cover disposed above said receptacle, a first member enclosing the top of said receptacle and secured to said cover, a second member embracing the bottom of said receptacle and secured to said trough, suspension means including a rod for securing together the elements named to form a unitary structure, said rod having means at one end thereof adapted to hold said cover in a fixed position on said rod, said receptacle and trough being slidably mounted upon the other end of said rod, and means between said rod and trough for retaining said receptacle and trough against said first member and releasable to permit said trough and cover to slide downwardly along said rod and for limiting the extent to which said trough and receptacle may be lowered and for holding them in their lowered position.

PAUL PUESCHEL.